United States Patent
Sielhorst (10) Patent No.: US 10,252,589 B2
(45) Date of Patent: Apr. 9, 2019

(54) TRAILER COUPLING HAVING AN EVALUATION DEVICE, EVALUATION DEVICE AND EVALUATION METHOD

(71) Applicant: WESTFALIA-AUTOMOTIVE GMBH, Rheda-Wiedenbruck (DE)

(72) Inventor: Bernhard Sielhorst, Rheda-Wiedenbruck (DE)

(73) Assignee: WESTFALIA-AUTOMOTIVE GMBH, Rheda-Wiedenbruck (DE)

( * ) Notice: Subject to any disclaimer, the term of this patent is extended or adjusted under 35 U.S.C. 154(b) by 303 days.

(21) Appl. No.: 15/121,279

(22) PCT Filed: Feb. 25, 2015

(86) PCT No.: PCT/EP2015/053886
§ 371 (c)(1),
(2) Date: Aug. 24, 2016

(87) PCT Pub. No.: WO2015/128346
PCT Pub. Date: Sep. 3, 2015

(65) Prior Publication Data
US 2017/0015163 A1     Jan. 19, 2017

(30) Foreign Application Priority Data
Feb. 28, 2014    (DE) ........................ 10 2014 002 677

(51) Int. Cl.
*B60D 1/24*         (2006.01)
*B60D 1/06*         (2006.01)
(Continued)

(52) U.S. Cl.
CPC ............... *B60D 1/248* (2013.01); *B60D 1/06* (2013.01); *B60D 1/54* (2013.01); *B60D 1/62* (2013.01); *G01L 1/048* (2013.01)

(58) Field of Classification Search
CPC ........ B60D 1/01; B60D 1/248; G01G 3/1406; G01G 19/08; G01G 19/086; G01M 7/00; B60T 7/18; B60T 8/1708; B60L 7/10
See application file for complete search history.

(56) References Cited

U.S. PATENT DOCUMENTS 3,481,183 A * 12/1969 Swift ...................... G01M 7/00
                                                                        73/146
3,650,340 A * 3/1972 Bradley ............... G01G 3/1406
                                                                        177/136
(Continued)

FOREIGN PATENT DOCUMENTS

| DE | 102011111519 | 5/2013 | | |
|----|--------------|--------|---|---|
| DE | 102012021352 | 5/2013 | | |
| DE | 102012021352 A1 * | 5/2013 | ............. | B60D 1/248 |

*Primary Examiner* — Joseph M Rocca
*Assistant Examiner* — Daniel S Yeagley
(74) *Attorney, Agent, or Firm* — Hoffmann & Baron, LLP (57) ABSTRACT

A trailer coupling for a towing vehicle, having a coupling carrier, which includes, in particular, a coupling arm and at whose free end a coupling body, in particular, a coupling ball is arranged for connecting a trailer, and which coupling carrier is fixedly or movably arranged on a mount which is or can be attached to the towing vehicle, and having a sensor arrangement which has at least one sensor and has the purpose of sensing a traction force and/or thrust force which can be caused by a traction load acting on the coupling element during a traction operation of the trailer and of outputting a force signal representing the traction force and/or thrust force, and having an evaluation device for determining a trailer mass value of the trailer on the basis of the force signal.

12 Claims, 4 Drawing Sheets

(51) Int. Cl.
*B60D 1/54* (2006.01)
*B60D 1/62* (2006.01)
*G01L 1/04* (2006.01)

(56) References Cited

U.S. PATENT DOCUMENTS

| | | | | |
|---|---|---|---|---|
| 3,669,756 | A * | 6/1972 | Bradley | G01G 3/1406 |
| | | | | 177/136 |
| 6,705,684 | B1 | 3/2004 | Garvey | |
| 6,829,943 | B2 * | 12/2004 | Weyand | G01G 19/086 |
| | | | | 340/667 |
| 7,430,491 | B2 * | 9/2008 | Gutierrez | G01G 19/08 |
| | | | | 177/1 |
| 8,380,390 | B2 * | 2/2013 | Sy | B60T 8/1708 |
| | | | | 280/400 |
| 9,580,052 | B2 * | 2/2017 | Batz | B60T 7/18 |
| 2011/0042154 | A1 * | 2/2011 | Bartel | B60L 7/10 |
| | | | | 180/11 |
| 2012/0130589 | A1 * | 5/2012 | Riehle | B60D 1/01 |
| | | | | 701/36 |
| 2013/0253814 | A1 | 9/2013 | Wirthlin | |

\* cited by examiner

TRAILER COUPLING HAVING AN EVALUATION DEVICE, EVALUATION DEVICE AND EVALUATION METHOD

This application claims priority based on an International Application filed under the Patent Cooperation Treaty, PCT/EP2015/053886, filed Feb. 25, 2015, which claims priority to DE102014002677.9, filed Feb. 28, 2014.

BACKGROUND OF THE INVENTION

The invention relates to a trailer coupling for a towing vehicle, having a coupling carrier, which comprises, in particular, a coupling arm and at whose free end a coupling body, in particular, a coupling ball is arranged for connecting a trailer, and which coupling carrier is fixedly or movably arranged on a mount which is or can be attached to the towing vehicle, and having a sensor arrangement which has at least one sensor and has the purpose of sensing a traction force and/or thrust force which can be caused by a traction load acting on the coupling element during a traction operation of the trailer and of outputting a force signal representing the traction force and/or thrust force, and having an evaluation device which has evaluation means for determining a trailer mass value of the trailer on the basis of the force signal. The invention also relates to an evaluation device and to an evaluation method for a trailer coupling of this kind.

A trailer coupling of this kind and evaluation device and evaluation method are illustrated, for example, in DE 10 2012 021 352 A1. The trailer mass is determined on the basis of the acceleration of the towing vehicle and the force on the coupling arm, i.e. the coupling carrier, occurring in the longitudinal direction of the vehicle, what is known as the x direction. In practice measuring errors or deviations result, however, which need to be eliminated.

SUMMARY OF THE INVENTION

It is therefore the object of the present invention to provide a trailer coupling, an evaluation device and an evaluation method which enable the trailer mass to be determined more exactly.

To achieve the object it is provided in a trailer coupling of the type mentioned in the introduction that the evaluation means are configured for determining the trailer mass value on the basis of an evaluation of at least one spring parameter which represents at least one spring property of the trailer coupling, in particular of the coupling carrier.

To achieve the object an evaluation method and an evaluation module are also provided. The evaluation module comprises program code or is formed thereby, and this can be executed by a processor. The program code is expediently stored on a storage medium, for example a memory card, a hard disk or the like. Execution of the program code of the evaluation module enables or brings about evaluation of a force signal which is output by a sensor arrangement having at least one sensor for sensing a traction force and/or thrust force which can be caused by a traction load acting on the coupling element during a traction operation of the trailer and represents the traction force and/or thrust force, and determining of a trailer mass value (ah) of the trailer on the basis of the force signal, wherein determining the trailer mass value comprises evaluating at least one spring parameter, wherein the at least one spring parameter represents at least one spring property of the trailer coupling, in particular of the coupling carrier.

The functions, in particular calculation functions, illustrated below can also advantageously be performed by the evaluation module or are expediently a component of the evaluation method. The program code of the evaluation module can be executed, for example by a controller of the towing vehicle, for example a tail control unit. The program code is programmed, for example in a high-level language, in particular C, and is then compiled. However, it can also be defined in an interpreter language.

The evaluation device according to the invention for a trailer coupling, which is provided for arrangement on a towing vehicle or is arranged on the towing vehicle, wherein the trailer coupling comprises a coupling carrier, in particular a coupling arm, at whose free end a coupling body, for example a coupling ball, is arranged, so a trailer can be connected, wherein the coupling carrier is fixedly or movably arranged on a mount which is or can be attached to the towing vehicle, has an input interface for a force signal which is supplied by a sensor arrangement having at least one sensor, which is provided for sensing a traction load or thrust force acting on the coupling element during a traction operation of the trailer, wherein the force signal represents the traction load or thrust force. It is also possible for the evaluation device to comprise the at least one sensor or sensor arrangement directly integrally. The evaluation device has evaluation means for determining a trailer mass value of the trailer on the basis of the force signal. According to the invention it is provided that the evaluation means are configured for determining the trailer mass value on the basis of an evaluation of at least one spring parameter, wherein the spring parameter represents a spring property of the trailer coupling, for example of the coupling carrier, the mount or the like.

The evaluation device can be, for example, a component of a controller for controlling and/or monitoring a trailer coupling, or be formed thereby. The evaluation device preferably has a bus interface or another kind of interface for communication with an electrical system of the towing vehicle.

It is a fundamental idea that the trailer coupling is not regarded as a relatively rigid unit but that the resilient and expediently also damping property of the trailer coupling is evaluated for determining the trailer mass. This is a completely new approach. In particular it is expedient to take into account the resilient or damping property of the coupling carrier or coupling arm in the inventive evaluation method or in the case of the evaluation device. However, it is also possible to sense the traction forces and thrust forces acting in the longitudinal direction of the vehicle and caused by the pulling of the trailer or the overrunning of the trailer onto the towing vehicle by way of sensors at a different point on the trailer coupling, for example on a mount, for example a pivot bearing, a plug-in support, or the like, holding the coupling arm, or also on a cross member or other carrying element which is attached to the rear of the motor vehicle, and in the process take into account the spring property of the respective component, namely also, for example, said mount or the carrying element (for example the cross member) when determining the trailer mass value.

One fundamental idea is that the trailer is stimulated by the acceleration of the towing vehicle to sway, as it were, relative to the towing vehicle, in other words is connected "resiliently" as it were, and in any case not completely rigidly, to the towing vehicle with the aid of the trailer coupling.

The force signal can be determined, for example, from the evaluation device on the basis of a strain signal or another signal of a strain sensor. It is understood that the evaluation device can also have an input interface directly for the force signal, i.e. that the sensor arrangement determines, for example, a strain or compression or other deformation of the component of the trader coupling sensed by it, for example of the coupling arm or its mount, and generates the force signal for the evaluation device therefrom.

The at least one spring parameter expediently comprises a spring constant of the coupling carrier, in particular of the coupling arm. The spring parameter can, however, also take into account a spring component of a different component of the trailer coupling, for example the mount for the coupling arm or coupling carrier, cross member or another carrying element. The spring parameter is determined, for example, on the basis of a finite element calculation (FEM), but can also be determined on the basis, for example, of (experimental) tests or a physical check.

The at least one spring parameter expediently forms a component of an equation evaluated by the evaluation device, and this maps the trailer as a component of a single-mass sway system. The trailer sways relative to the towing vehicle therefore. The equation is, for example, a differential equation. The mass can be determined in a single-mass sway system in a variety of ways, i.e. there is a plurality of approaches for determining the mass of the trailer or trailer mass value. This will become clear below.

An expedient variant of the invention provides that the at least one spring parameter forms a component of an equation evaluated by the evaluation device, for example a differential equation, with this equation comprising as a further component the product of the trailer mass value and a trailer acceleration value representing the acceleration of the trailer, or a towing vehicle acceleration value as relative to the trailer acceleration value, which represents the acceleration of the towing vehicle. The trailer acceleration value can optionally be measured directly by an acceleration sensor on board the trailer, for example its towing bar. This is not the case in the embodiment shown in the drawings, however. The evaluation device and evaluation method determine the acceleration of the trailer indirectly, as it were, by way of the acceleration of the towing vehicle. This can occur on the basis of a differential equation.

The evaluation means are preferably also configured for determining the trailer mass value on the basis of an evaluation of at least one damper parameter. The damper parameter represents a damping property of the trailer coupling within the meaning of sway damping. The trailer coupling therefore provides a cushioning effect but also has a damping property, i.e. the sway is in turn reduced or damped by the trailer coupling itself. The damping parameter or damping value can represent, for example, a damping property resulting from material properties, for example of the coupling arm, cross member or the mount for the coupling arm. The damping parameter can, however, also represent damping which is caused by an overrun damper effective between towing vehicle and trailer. The damping parameter can also represent friction which similarly has a damping effect. Finally, it is also possible for the damping parameter to take into account or represent friction in a chassis, for example of the trailer.

The equation or differential equation is basically as follows, for example:

$$0 = mh^* ah + d^* v + c^* s \qquad (1)$$

where mh is the mass of the trailer ah is the acceleration of the trailer, i.e. the trailer acceleration value, c is, as it were, the spring constant of the trailer coupling, i.e. the at least one spring parameter, v is the speed of the trailer, s is the path of the trailer, d is said at least one damping parameter, i.e., for example, the damping property of the trailer coupling.

The spring constant and the damper parameter are, for example, parameters of the coupling arm or coupling carrier.

Formula (1) can be formulated as follows and by taking into account the towing vehicle acceleration $$0 = m_h^* \Delta \ddot{s} + d^* \Delta \dot{s} + c^* \Delta s \qquad (2)$$

$\Delta s$ is then the difference (path difference) between vehicle path and trailer path, which in the above equation is multiplied directly by the at least one spring parameter.

Furthermore, the first derivation of the path difference $\Delta s$ after time, i.e. the speed value, is multiplied by the at least one damper parameter.

The second derivation of the path difference $\Delta s$ after time, namely the acceleration value, is multiplied by the mass of the trailer.

The acceleration is therefore considered to be the second derivation of the path difference $\Delta s$ and the speed as the first derivation after time of the path difference $\Delta s$.

The system is stimulated by the towing vehicle, i.e. the towing vehicle exercises the following stimulation on the trailer by way of the trailer coupling:

$$Fx_A = m_{fzg}^* \Delta \ddot{s}_{fzg} \qquad (3)$$

Here mfzg is the mass of the towing vehicle which is multiplied by the acceleration of the towing vehicle which is, as it were, multiplied by the second derivation after time of the path $\Delta$sfzg covered by the towing vehicle in order to determine the stimulating force FxA.

The stimulating force FxA is the force which is determined by the sensor arrangement, i.e. is included in the force signal (traction force or thrust force or both).

The evaluation device is expediently configured for determining the trailer mass value on the basis of a comparison between a progression over time of the force signal measured on the basis of the sensor arrangement, or the determined force signal, and a force progression over time determined on the basis of a mathematical model.

The model maps the trailer and comprises, for example, an adopted trailer mass value that represents the mass of the trailer, and a trailer acceleration value that represents the acceleration of the trailer, in particular a measured or calculated trailer acceleration value. However, the model can comprise, as an alternative or in addition to this trailer acceleration value, said towing vehicle acceleration value that represents the acceleration of the towing vehicle. As stated, it is possible to infer the acceleration of the trailer backwards, as it were, from the acceleration of the towing vehicle, and the evaluation device or the evaluation method according to the invention can also achieve this.

The equation for the model, for example, the observer is, as follows, for example:

$$fx_{mod} = c_{mod}^* (s_{fzg} - s_{hmod}) + d_{mod}^* (\dot{s}_{fzg} - \dot{s}_{hmod}) \qquad (4)$$

Here fxmod is the force acting in the X direction and determined on the basis of the model, cmod is a spring parameter, for example a spring constant, which forms the basis of the model, sfzg is the path covered by the towing vehicle, from which shmod, namely the path covered by the trailer (adopted in the model) is deducted, and this is simultaneously the change in the length of the trailer coupling caused by the force Fx acting in the x direction, dmod is the damper parameter adopted in the model which is multiplied by the difference in the respective first derivation after time of sfzg and shmod.

The second derivation after time of the path shmod covered by the trailer, i.e. the trailer acceleration value ahmod, in the model is simultaneously the quotient of the force fxmod acting in the x direction and determined on the basis of the model and a mass of the trailer mhmod adopted in the model:

$$\ddot{s}_{hmod} = \frac{fx_{mod}}{m_{hmod}} \quad (5)$$

It can be seen that the values for the path (for example shmod, sfzg, sh), speed and acceleration can be transferred into each other by appropriate integration after time or derivation after time in order to trigger differential equation (2) in this way. This can occur numerically, for example. A Laplace transform would be one method, for example, for solving the differential equation.

The evaluation device varies, for example, one or more parameter(s) in the mathematical model, for example equation (4), to adjust the determined force progression to the progression of the measured force signal. The trailer mass value is determined iteratively, as it were, thereby. In the case of said comparison between the force signal according to the mathematical model and the measured force signal a differential value, for example, is formed and the parameters of the model are then changed as a function of the differential value. One of these parameters is, for example, the spring parameter. A further parameter can also be said damper parameter. It is understood that the model can include a plurality of damper parameters and spring parameters, for example spring parameters of a cross member and the coupling arm or damper parameters of these two components. It is also possible for the evaluation device or evaluation method to vary the trailer acceleration value determined indirectly, as it were, by way of the acceleration of the towing vehicle.

At this point it should be noted that the at least one damper parameter, i.e. the effect of damping on the respective formulae (1)-(3) above can also be ignored, i.e. this term part can also be omitted, for example in equation (1) or (4), without the quality of the trailer mass value determined according to the invention becoming significantly worse thereby, i.e., for example:

$$fx_{mod} = c_{mod}*(s_{fzg} - s_{hmod}) \quad (6)$$

The evaluation device comprises the mathematical model in the manner, for example, of a control-engineering observer. The mathematical model can also comprise a differential equation in this embodiment or an alternative embodiment.

It is also expedient if the evaluation device or evaluation method comprises a numerical, iterative evaluation of at least one differential equation, wherein this differential equation expediently comprises said at least one spring parameter or damper parameter.

An advantageous embodiment of the invention provides that the evaluation device is configured for determining a trailer acceleration value, representing the acceleration of the trailer, on the basis of a differential equation, in particular equations (4) and/or (5).

At this point it should be noted that, in principle, it is conceivable and possible for an acceleration sensor on board the trailer to signal directly, as it were, the acceleration of the trailer and for the evaluation device to then take this into account. As a rule, however, a trailer is involved which does not have any sensors. This is where the invention comes in and allows the acceleration of the trailer to be calculated indirectly, as it were, using an acceleration value which is formed from the towing vehicle.

It is possible for the evaluation device to have an input interface for an acceleration value of the towing vehicle, for example from an electrical system of the towing vehicle. The towing vehicle can therefore supply, for example, its respective acceleration to the evaluation method or the evaluation device according to the invention. This can also occur indirectly, namely, for example, as a speed signal which is then differentiated by the evaluation device accordingly.

However, it is advantageous if at least one acceleration sensor is provided on board the evaluation device, at all events on board the trailer coupling. The sensor determines the towing vehicle acceleration value locally and independently, as it were, from the electrical system of the towing vehicle.

The sensor arrangement expediently comprises at least one strain sensor which is arranged on a component of the trailer coupling and is configured for sensing a deformation of the component of the trailer coupling by way of the traction force and/or thrust force. The component is, for example, the coupling carrier, in particular the coupling arm. The component can, however, also comprise the mount or a carrier of the trailer coupling which is provided for attaching to the towing vehicle or is arranged on the towing vehicle, for example a cross member.

DETAILED DESCRIPTION OF THE PREFERRED EMBODIMENTS

A pair 10 according to FIGS. 1 to 4 comprises a towing vehicle 11, for example a car, on whose tail 12 a trailer coupling 30 is arranged.

The trailer coupling 30 comprises as a coupling carrier 32 a coupling arm 31, for example, which is detachably arranged, fixedly or movably, for example, relocatably and/or pivotally between a position of use and a rest position for example with the aid of a plug-in connection, to a cross member 41 attached to the tail 12 of the towing vehicle 11. At any event, in the position of use the coupling arm 31 protrudes backwards beyond the tail 12, for example on a bumper 13 of the towing vehicle 11, so a trailer 20 can be coupled to the towing vehicle 11.

The trailer 20 has, for example, a tow bar 21 on whose leading free end region a coupling, in particular a ball coupling 22 is arranged. The ball coupling 22, or at any event the trailer-side coupling, can be detachably connected to the towing vehicle trailer coupling 30. This is known per se. For example, a coupling body 33, which is arranged at the free end of the coupling carrier 32 or coupling arm 31, engages in a recess 23 in the ball coupling 22 and is pivotally mounted there. The coupling body 33 comprises, for example, a coupling ball 34.

The coupling carrier 32 or coupling arm 31 is rotatably mounted, for example, at an attachment region 35 to a bearing (not shown) of a mount 45. The mount 45 is permanently assembled, for example on the cross member 41, or is formed by the cross member.

A section 36, which has a curve and merges into a section 37, extends from the attachment region 35, which could also be called a mounting region. Section 37 runs, for example, past the bumper 13 of the towing vehicle 11 and is substantially straight, with a curve or the like also being possible (in an alternative embodiment of the coupling arm). At any event section 37 merges with a curve 38 into a raised section 39 on whose free end region a standard cylindrical section 40 is provided which, for its part, in turn carries the coupling body 33. These geometric conditions are advantageous although a coupling carrier or coupling arm with a different design, or a different coupling body, for example a cubic coupling body, are also possible.

Figure 6:
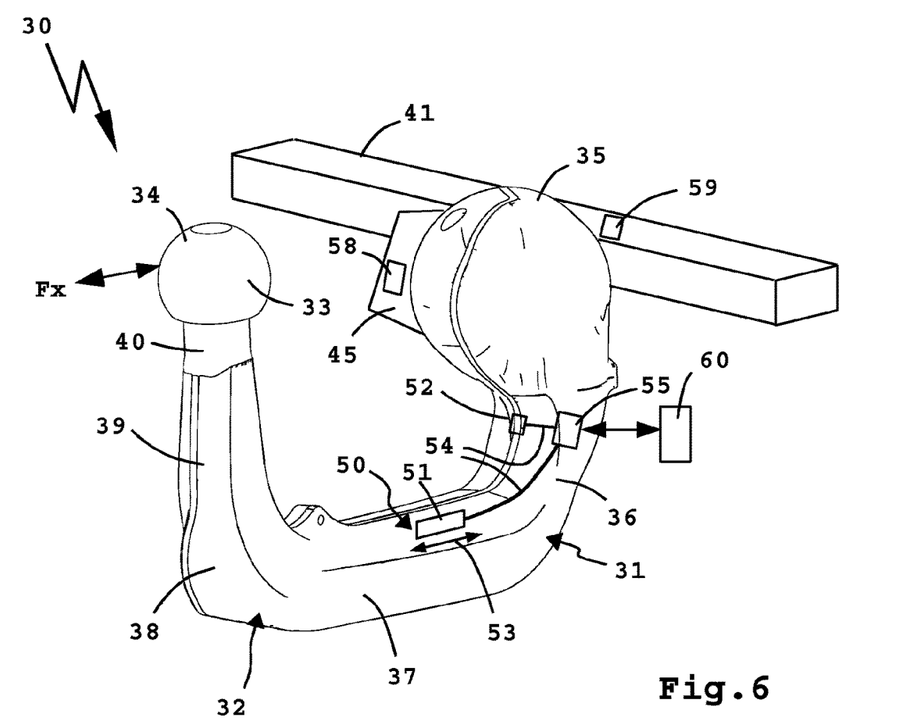
FIG. 6 shows a detailed view of the trailer coupling according to the above figures with schematically drawn force sensors.

A sensor arrangement 50 with, for example, a sensor 51 and a sensor 52 is provided on the coupling carrier 32, i.e. the coupling arm 31. The sensor 51 is arranged, for example, on section 37, so it can sense, for example, a change in length 53 of section 37, of the coupling carrier 32 or coupling arm 31 therefore. The change in length 53 is caused, for example, by a towing load or thrust force load, i.e. for example the specifically connected trailer 20, when the pair 10 accelerates or decelerates. The sensor 51 is or comprises, for example, a strain sensor or strain gauge.

The sensor 52 is provided on the curved section 36 of the coupling carrier 32 or coupling arm 31 and substantially senses an effect of a supporting load which acts on the coupling arm 31. This should not be in the foreground, however. It is also possible for the sensor 52 to sense a change in length of section 36 of the coupling arm 31 which is caused by a towing load or thrust force load. The sensor 52 is preferably also a strain sensor or comprises a strain gauge.

The sensors 51, 52 are connected or joined by cables 54, or wirelessly, to a transmission device 55. The status signals 56 generated by the sensors 51, 52 are transmitted to an evaluation device 60, for example via cables or wirelessly, for example via radio or optically.

An evaluation device 60 then determines a mass mh of the trailer 20 on the basis of the status signals 56.

Figure 5:
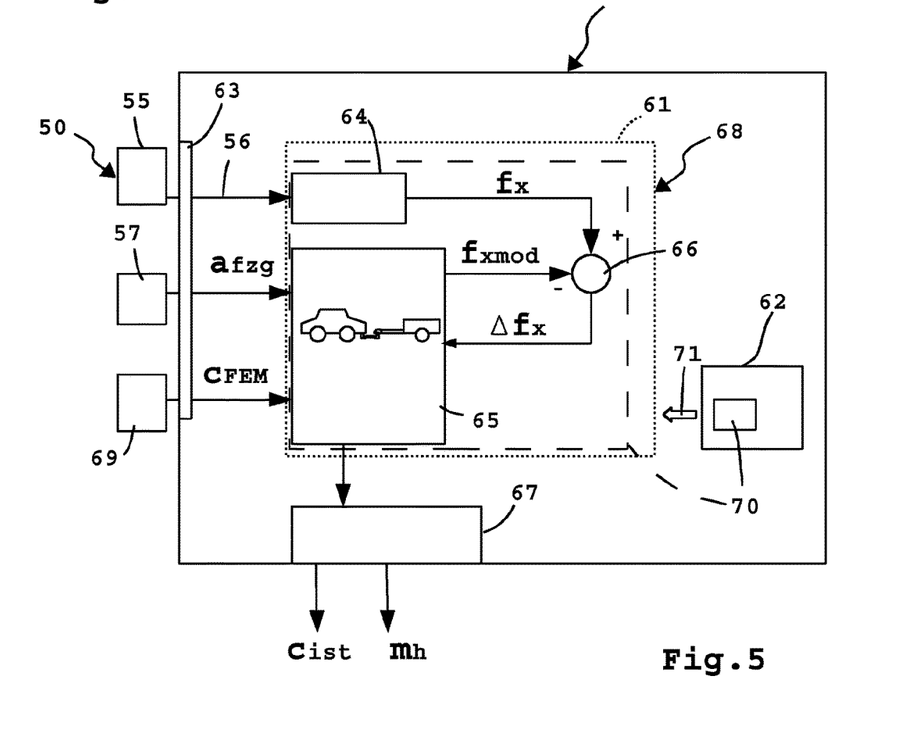
FIG. 5 shows a schematic diagram of an evaluation device of the trailer coupling.

The evaluation device 60 comprises, for example, a processor 61 for executing program commands or program code of a program, for example of an evaluation module 70, and a memory 62 for storing values, for example parameters, interim values and the like, and said program or evaluation module 70. The evaluation module 70 can be loaded, for example, by the processor 61 from the memory 62, and this is indicated by an arrow 71. The program code of the evaluation module 70 is programmed, for example, in programming language C, and then compiled, with other programming languages also being readily possible of course for implementing an evaluation module 70 according to the invention with program code.

The evaluation device 60 has, for example, an input interface 63 via which it can sense the status signal 56.

A signal evaluation unit 64, which can be formed, for example, by program code of the evaluation module 70 and/or by an appropriate hardware component, for example by at least one logic module, evaluates the status signal 56 which represents a traction force or thrust force, or both, acting on the coupling arm 31 namely as a measured signal which constitutes, for example, a change in length 53 of the sensor 51 or sensor 52 or both. The status signal 56 is converted by the signal evaluation unit 64 into a force signal fx which represents the force acting on the trailer coupling 30 in the x direction, in other words a traction force and/or thrust force Fx therefore.

At this point it should be noted that it can of course also be provided that the sensors 51 or 52 can form integral components of the signal evaluation unit 64 or that, for example, the sensor arrangement 50 already generates the force signal fx.

Figure 1:
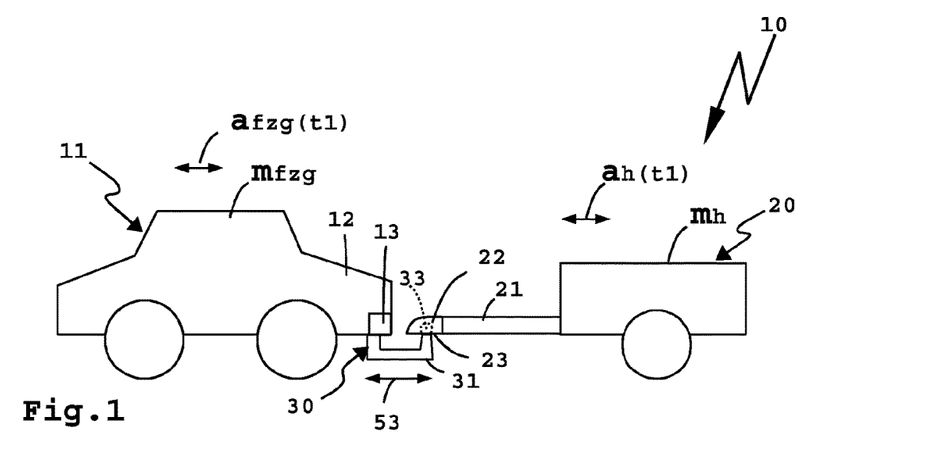
FIG. 1 shows a pair comprising a towing vehicle and a trailer connected to the towing vehicle with the aid of a trailer coupling in a substantially non-accelerated driving process.
Figure 2:
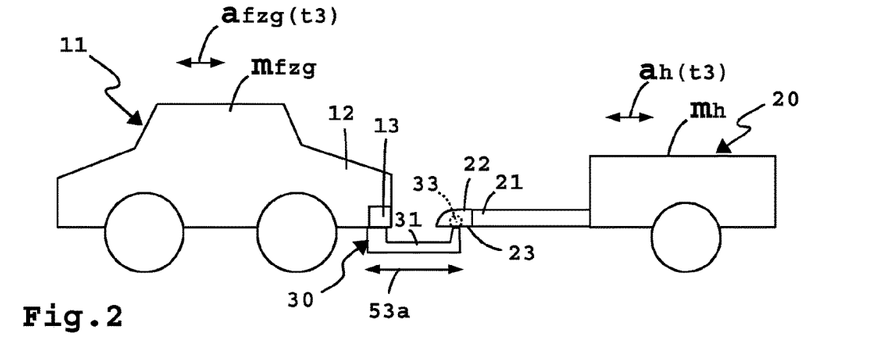
FIG. 2 shows the pair according to FIG. 1 during an acceleration of the towing vehicle.
Figure 3:
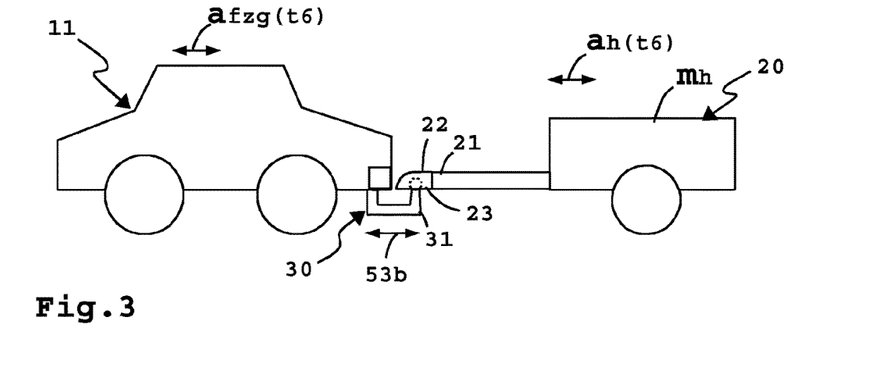
FIG. 3 shows the pair according to FIGS. 1, 2, during a braking process of the towing vehicle.

FIGS. 1 to 3 show various acceleration states of the pair 10.

At time t1 according to FIG. 1 the towing vehicle 11 has, for example, a towing vehicle acceleration value afzg(t1) while the trailer 20 has a trailer acceleration value ah(t1) which is exactly the same as far as possible or very similar. The pair is therefore virtually at a uniform acceleration. The change in length 53 of the trailer coupling 30 is therefore, roughly zero, for example.

Figure 4:
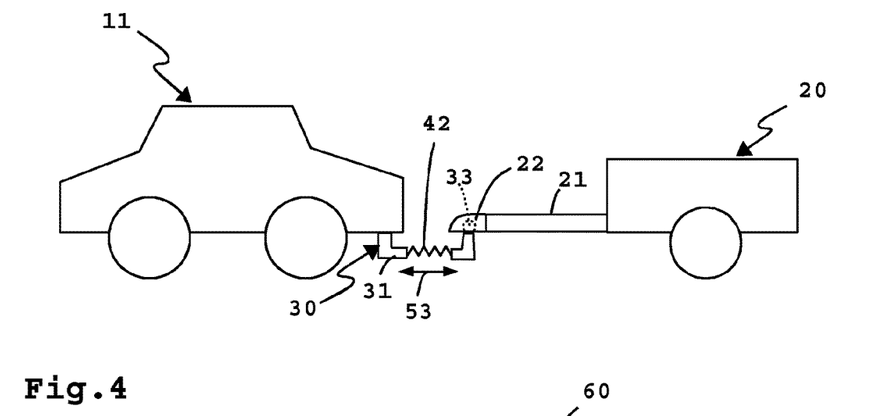
FIG. 4 shows the pair according to the above figures, with a trailer coupling including a symbolically illustrated spring.

At a time t3 the pair 10 accelerates, wherein the towing vehicle acceleration afzg(t3) is greater than the acceleration of the trailer, i.e. greater than the trailer acceleration value ah(t3). Therefore the trailer 20 does not keep up, as it were, or is slower, causing a change in length 53a of the trailer coupling 30. The trailer coupling 30 extends like a spring 42, and this is indicated in FIG. 4. There the coupling arm 31 or coupling body 32 is shown with an integrated spring 42 (and this should be understood symbolically).

During a braking operation or thrust force operation the conditions reverse, i.e. the trailer coupling 30 experiences a thrust force, a negative acceleration as it were, and this occurs, for example, at time t6. The towing vehicle acceleration afzg(t6) is negative therefore, the trailer 20 pushes, as it were, so the trailer coupling 31 experiences a change in length 53b.

The evaluation device 60 is now in a position to take into account the spring property of the trailer coupling 30, to take into account the spring 42, as it were, when determining the real mass of the trailer 20.

The evaluation device 60 has a model generator 65 which generates a model force progression fxmod on the basis of the acceleration afzg of the towing vehicle 11 and a spring parameter c and the above formulae (4) and (5), with the damping d optionally also being considered, although this does not have to be the case. The model generator 65 can be formed or be represented, for example, by program code of the evaluation module 70.

The model generator 65 varies different values, in particular the spring constant c and damper parameter d (if it is taken into account), and in the model also the mass of the trailer 20, i.e. the trailer mass value mhmod.

The force signal fxmod and the force signal fx are connected on a differential element 66 and this forms a difference Δfx therefrom. The differential element 66 can be formed by program code of the evaluation module 70. This difference Δfx is in turn supplied to the model generator 65 which varies, for example, the trailer mass value nhmod and preferably also the spring parameter c and/or the damper parameter d as a function of the difference Δfx. The structure of a control-engineering observer emerges from FIG. 5.

Figure 7:
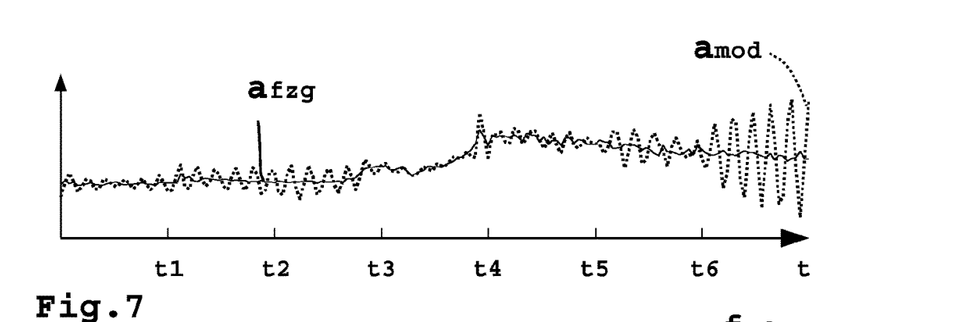
FIG. 7 shows progressions of measured acceleration values and those determined on the basis of a model.

FIG. 7 shows the deviation between the towing vehicle acceleration value afzg and the trailer acceleration value ahmod of the model if damping d is not taken into account. It can be seen, in particular, after time t6 that the trailer 20 sways relatively severely with respect to the towing vehicle 11.

Figure 8:
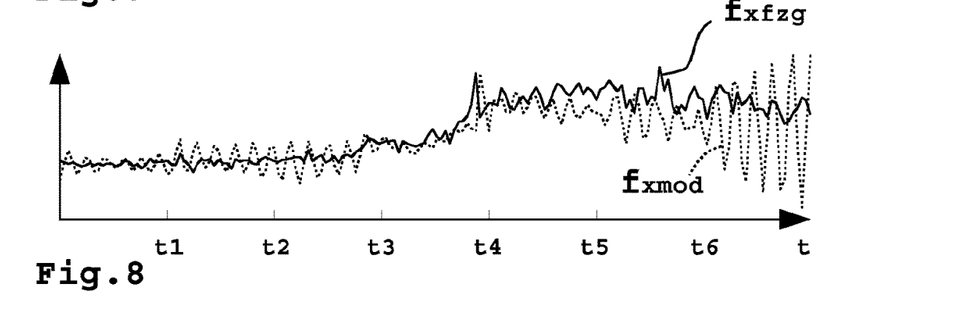
FIG. 8 shows progressions of a measured traction force on the trailer coupling and a traction force determined on the basis of a model.

FIG. 8 shows a force progression fx determined on the basis of the sensor arrangement 50 and a force progression fxmod generated or determined on the basis of the model of the model generator if damping d is likewise not taken into account. Relatively severe swaying of the trailer can be seen here as well. However, it is striking that the sway progression of the measured force fx and the force fxmod determined on the basis of the model occurs in the same clock, i.e. the model already supplies very good values.

Figure 9:
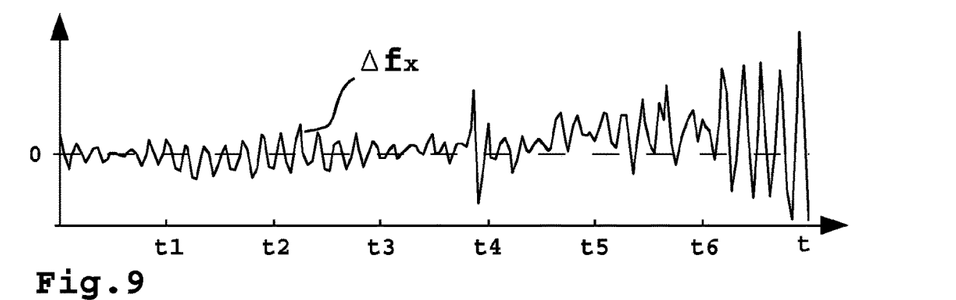
FIG. 9 shows a progression of a force difference between the traction force determined on the basis of the model and the measured traction force according to FIG. 8.

FIG. 9 shows the progression of the difference Δfx.

Figure 10:
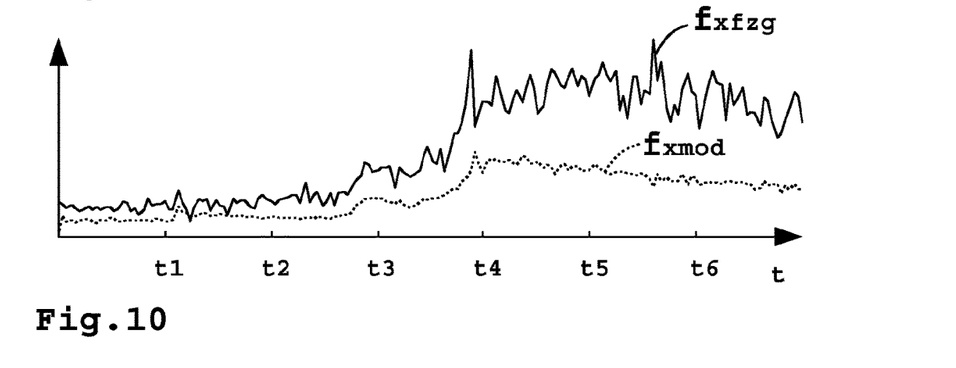
FIG. 10 shows progressions of a measured traction force on the trailer coupling and a traction force determined on the basis of a model, similar to in FIG. 8 but in the case of an adopted mass value of the trailer which is highly inaccurate.

FIG. 10 illustrates that in the case of an adopted trailer mass value mhmod which is highly inaccurate there is a large deviation between the metrologically determined force progression fx and the force progression fxmod determined on the basis of the model. For example, the mass mhmod of the trailer 20 adopted in the model is only half as large as the real mass of the trailer 20.

If the evaluation means 68 comprising the model generator 65 has now determined on the basis of at least one acceleration process or a plurality of acceleration processes that the progression of the difference Δfx is roughly zero, i.e. that the mass value mhmod of the trailer 20 adopted in the model is at least to some extent correct and the difference Δfx is at least low, it outputs, for example, the trailer mass value mh at an output interface 67, and this substantially represents the real mass of the trailer 20.

Further values can also be output at the output interface 67, for example a spring constant cist of the trailer coupling 30. The spring constant c is namely firstly determined, for example, by way of an FEM calculation and parameterized as cFEM by way of the input interface 63 or by way of a parameterising interface 69 upstream thereof. The spring constant cFEM forms, for example, a start value for the model generator 65. It is also possible for the initial spring constant or the start value to be permanently programmed or defined in the model generator 65.

Damper parameters d that form the basis of the model can also have a start value which is indicated at the input interface 63 or is permanently stored in evaluation device 60, for example its evaluation program or evaluation module 70. The damper parameter d can also be determined on the basis of an FEM calculation or have a component which is determined on the basis of such a calculation.

A deformation caused by the traction force Fx or thrust force can also be sensed by sensors 58 on the mount 45 or 59 on the cross member 41, however. The evaluation device 60 can of course also carry out the method according to the invention on the basis of signals from the sensors 58, 59, for example strain sensors, preferably even redundantly in relation to values of the sensors 51 and/or 52. Sensors 58, 59 are connected by cables (not shown) or are wirelessly connected to the transmission device 55.

The invention claimed is:

1. A trailer coupling for a towing vehicle, having a coupling carrier, which comprises a coupling arm and at whose free end a coupling ball is arranged for connecting a trailer, and which coupling carrier is fixedly or movably arranged on a mount, which is or can be attached to the towing vehicle, and having a sensor arrangement, which has at least one sensor and has the purpose of sensing a traction force and/or thrust force which can be caused by a traction load acting on the coupling carrier during a traction operation of the trailer and of outputting a force signal representing the traction force and/or thrust force, and having an evaluation device for determining a trailer mass value of the trailer on the basis of the force signal, wherein the evaluation device is configured to determine the trailer mass value on the basis of an evaluation of at least one spring parameter, which represents at least one spring property of the coupling carrier, wherein the at least one spring parameter forms a component of a differential equation, evaluated by the evaluation device, which maps the trailer as a component of a single-mass sway system.

2. The trailer coupling according to claim 1, wherein the at least one spring parameter comprises a spring constant of the coupling carrier or the coupling arm.

3. The trailer coupling according to claim 1, wherein the at least one spring parameter forms a component of a differential equation, evaluated by the evaluation device, which comprises as a further component the product of the trailer mass value and a trailer acceleration value representing the acceleration of the trailer and/or a towing vehicle acceleration value representing the acceleration of the towing vehicle.

4. The trailer coupling according to claim 1, wherein the evaluation device is configured for determining a trailer acceleration value representing the acceleration of the trailer on the basis of a differential equation.

5. The trailer coupling according to claim 1, wherein the sensor arrangement has at least one strain sensor, which is arranged on the coupling carrier and/or the mount holding the coupling carrier and/or a carrier of the trailer coupling attached to the towing vehicle and is provided for sensing a deformation of the coupling carrier or mount or carrier caused by the traction force or thrust force.

6. A trailer coupling for a towing vehicle, having a coupling carrier, which comprises a coupling arm and at whose free end a coupling ball is arranged for connecting a trailer, and which coupling carrier is fixedly or movably arranged on a mount, which is or can be attached to the towing vehicle, and having a sensor arrangement, which has at least one sensor and has the purpose of sensing a traction force and/or thrust force which can be caused by a traction load acting on the coupling carrier during a traction operation of the trailer and of outputting a force signal representing the traction force and/or thrust force, and having an evaluation device for determining a trailer mass value of the trailer on the basis of the force signal, wherein the evaluation device is configured to determine the trailer mass value on the basis of an evaluation of at least one spring parameter, which represents at least one spring property of the coupling carrier,     wherein the evaluation device is configured for determining the trailer mass value on the basis of an evaluation of at least one damper parameter, wherein the damper parameter represents a damping property of the trailer coupling within the meaning of sway damping.

7. The trailer coupling according to claim 6, wherein the damper parameter represents damping caused by the material of the coupling carrier and/or damping caused by an overrun damper and/or damping caused by friction in a chassis.

8. A trailer coupling for a towing vehicle, having a coupling carrier, which comprises a coupling arm and at whose free end a coupling ball is arranged for connecting a trailer, and which coupling carrier is fixedly or movably arranged on a mount, which is or can be attached to the towing vehicle, and having a sensor arrangement, which has at least one sensor and has the purpose of sensing a traction force and/or thrust force which can be caused by a traction load acting on the coupling carrier during a traction operation of the trailer and of outputting a force signal representing the traction force and/or thrust force, and having an evaluation device for determining a trailer mass value of the trailer on the basis of the force signal, wherein the evaluation device is configured to determine the trailer mass value on the basis of an evaluation of at least one spring parameter, which represents at least one spring property of the coupling carrier,     wherein the evaluation device is configured for determining the trailer mass value on the basis of a comparison between a progression over time of the force signal measured on the basis of the sensor arrangement and a force progression over time determined on the basis of a mathematical model, wherein the model maps the trailer and comprises an adopted trailer mass value representing the mass of the trailer and a trailer acceleration value representing the acceleration of the trailer and/or a towing vehicle acceleration value representing the acceleration of the towing vehicle.

9. The trailer coupling according to claim 8, wherein the evaluation device in the mathematical model varies the adopted trailer mass value for adjusting the force progression determined on the basis of the mathematical model to the progression of the measured force signal and/or the at least one spring parameter and/or a damper parameter.

10. The trailer coupling according to claim 8, wherein the evaluation device implements the mathematical model in the manner of a control-engineering observer and/or has a differential equation.

11. An evaluation method for a trailer coupling provided for a towing vehicle, having a coupling carrier, which comprises a coupling arm and at whose free end a coupling ball is arranged for connecting a trailer, and which coupling carrier is fixedly or movably arranged on a mount, which is or can be attached to the towing vehicle, wherein the evaluation method provides an evaluation of a force signal, which is output by a sensor arrangement having at least one sensor for sensing a traction force and/or thrust force, which can be caused by a traction load acting on the coupling carrier during a traction operation of the trailer and represents the traction force and/or thrust force, and determining a trailer mass value of the trailer on the basis of the force signal, wherein the evaluation method comprises determining a trailer mass value on the basis of an evaluation of at least one spring parameter on the basis of evaluation means, wherein the at least one spring parameter represents at least one spring property of the coupling carrier, and     wherein the method is carried out in the case of at least two successive braking or accelerating processes of the pair comprising towing vehicle and trailer for iterative determination of the trailer mass value, wherein a mean of the trailer mass value is formed.

12. An evaluation module for a trailer coupling provided for a towing vehicle, having a coupling carrier, which comprises a coupling arm and at whose free end a coupling ball is arranged for connecting a trailer, and which coupling carrier is fixedly or movably arranged on a mount, which is or can be attached to the towing vehicle, wherein the evaluation module comprises program code that can be executed by a processor:

for evaluating a force signal, which is output by a sensor arrangement having at least one sensor for sensing a traction force and/or thrust force, which can be caused by a traction load acting on the coupling carrier during a traction operation of the trailer and represents the traction force and/or thrust force; and     for determining a trailer mass value of the trailer using the force signal, wherein     determining the trailer mass value comprises an evaluation of at least one spring parameter, wherein the at least one spring parameter represents at least one spring property of the coupling carrier.

\* \* \* \* \*